Figure 1A:
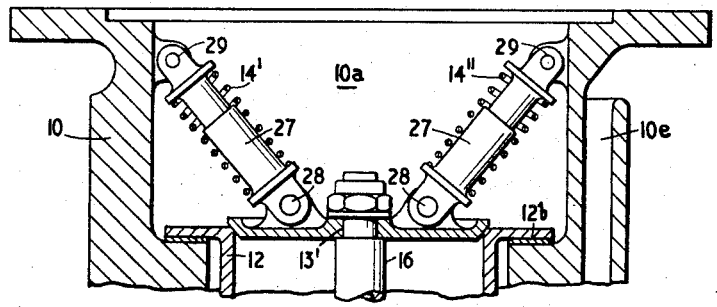

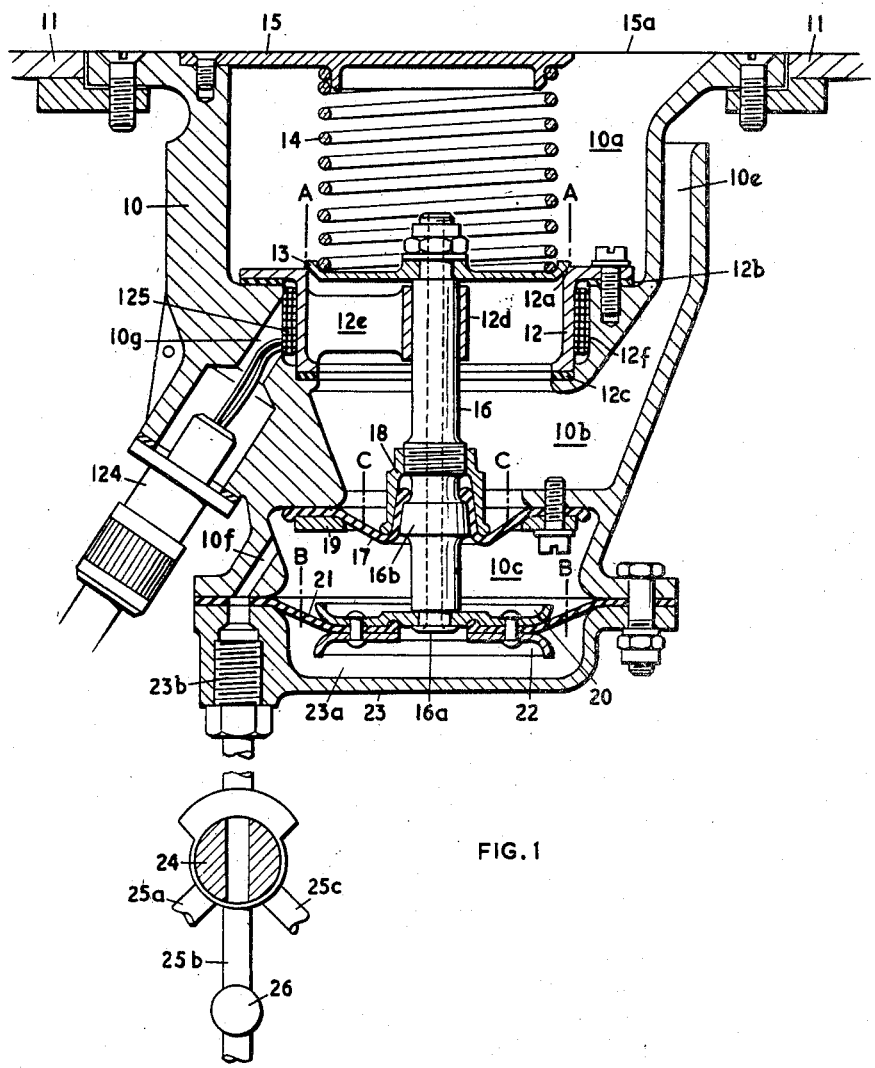

Jan. 15, 1957  A. C. BOSWELL  2,777,463
FUEL TANK FOR AIRCRAFT
Filed April 6, 1953  2 Sheets-Sheet 2

INVENTOR
Arthur C. Boswell
BY
ATTORNEYS

United States Patent Office 2,777,463
Patented Jan. 15, 1957

2,777,463

FUEL TANK FOR AIRCRAFT

Arthur Charles Boswell, Preston, England, assignor to The English Electric Company Limited, London, England, a British company Application April 6, 1953, Serial No. 346,929

Claims priority, application Great Britain April 25, 1952

8 Claims. (Cl. 137—341)

The invention relates to fuel tanks of aircraft where it is desired to keep the internal pressure of the container at a predetermined level independently of the varying effect of the speed at which the surrounding air moves relatively to the container.

For example fuel tanks arranged in the wings of aircraft usually have vent valves which issue at regions of the aerofoil of the wing, where the aerodynamic effect of the relative movement of the air causes a depression, the effect of which is to be compensated by the construction of the vent valve.

In a fuel tank according to the invention the action of aerodynamic pressure on the valve head of a vent valve is balanced by its action in the opposite sense on a pressure responsive means of an effective area equivalent to that of the said valve head and mechanically connected to the said valve head, the said valve being opened against a resilient biasing force when the internal pressure of the said tank acting on a second pressure responsive means of an effective area different from that of the said valve head and mechanically connected to the said valve head exceeds by a predetermined value the static air pressure acting on the same in the opposite direction.

Assuming $p_0$ to be the static air pressure, $p$ to be the depression of local pressure below said static pressure, the aerodynamic pressure is $p_0-p$ acting on the valve head of an area $mA^2$, and in the opposite direction on a first pressure responsive means of the effective area $mB^2$ equal to that of the valve head. The internal tank pressure $p_t$ acts on the said valve head from inside the said tank, and on the second pressure responsive means of the effective area $mC^2$ different from that of the said valve head. The said static pressure $p_0$ acts on both the said pressure responsive means in opposite directions. The resilient closing force be $mS$. Then:

$$m[(p_0-p)A^2+p_tC^2+p_0B^2+S] =$$
$$m[(p_0-p)B^2+p_0C^2+p_tA^2]$$

or $$p_0(A^2+B^2-C^2-B^2)+p(B^2-A^2)+S=p_t(A^2-C^2)$$

As $A=B$ it follows that $$p_t-p_0=S/(A^2-C^2)$$

that is the difference between the internal pressure $p_t$ of the fuel tank and the static pressure $p_0$ at which the valve opens is independent of the local aerodynamic pressure head, and depends merely on the resilient force and the respective sizes of the valve head and the second pressure responsive means.

In order that the invention may be clearly understood and readily carried into effect, some embodiments thereof will now be described by way of example with reference to the accompanying drawings, in which:

Fig. 1 is a sectional side elevation of one embodiment of a vent valve for a fuel tank of an aircraft in the closed position.

Figure 2:
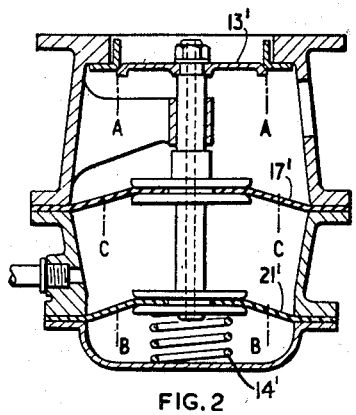
Figure 3:
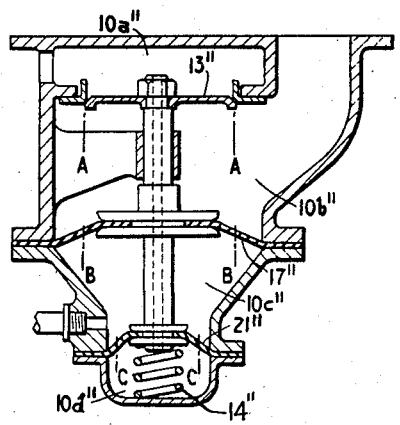
Figure 4:
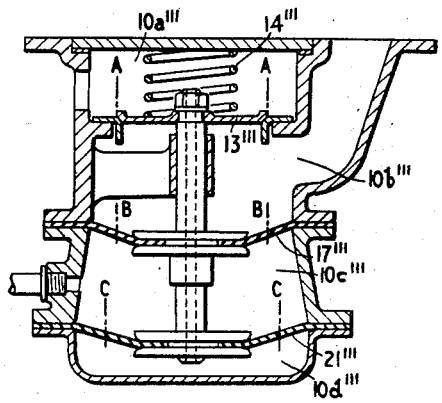

Figs. 2 to 4 diagrammatically show three modifications of this embodiment.

Fig. 5 shows a modified detail of Fig. 1.

Referring first to Fig. 1, a valve casing 10 having compartments 10a, 10b and 10c fits flush with the skin 11 of an aeroplane, which skin forms here the wall of the fuel tank. A cup 12 having a valve seating 12a formed around an inside edge thereof is fixed to the casing 10 and is sealed thereto by sealing pieces 12b and 12c. A valve head 13 is normally pressed from outside on to the seating 12a by a coiled compression spring 14 arranged between the valve body 13 and a plate 15 secured to the casing 10. The plate 15 has a cut-away portion 15a which provides communication between the compartment 10a and the air flowing over the aircraft.

Compartment 10b is separated from compartment 10a by the valve head 13 in the closed position shown, and is in communication with the fuel tank surrounding the valve casing through the inlets 10e which extend around the circumference of the casing 10.

A hollow valve spindle 16, having a bore 16a extending lengthwise therethrough, extends longitudinally along the axis of the casing 10 through a valve guide 12d supported on an arm 12e of the cup 12. A diaphragm 17 has its inner portion clamped between a conical shoulder 16b on the spindle 16, and an inner conical surface of a bell shaped ferrule 18 screwed on to the spindle 16. The outer portion of the diaphragm 17 is secured between a washer 19 and the casing 10. The diaphragm 17 thus seals off the compartment 10b from the compartment 10c. A pair of dish-shaped plates 20 and 22 is secured to the inner end of the spindle 16, and a second diaphragm 21 has its inner portion secured between the dish-shaped plates 20 and 22, and has its outer edge secured between a lid 23 and the casing 10. Hence the diaphragms 21 and the plates 20 and 22 seal off the compartment 10c from a compartment 23a formed inside the lid 23. The compartment 23a is in communication with the compartment 10a through the bore 16a. An air conducting pipe (not shown) is connected with a socket 23b of the lid 23 and is in communication with a part of the aeroplane known to be at static atmospheric pressure, and with the compartment 10c through an outlet 10f. An electrical heating element 125 is accommodated within a space 12f formed between the cup 12 and the casing 10 and is made liquid and gas tight by the sealing pieces 12b and 12c. Leads 126 from the element 125 pass through an opening 10g in the casing 10 and pass through a sealing gland 124 to an electrical power supply (not shown).

In operation, when the pressure of gases or vapours above the fuel in the fuel tank and thus in the compartment 10b exceeds the pressure in the compartment 10c by more than a predetermined amount, the valve head 13 moves away from the seating 12a against the force of the spring 14 and allows gases or vapours to pass from the fuel tank through the inlets 10e, the chambers 10b and 10a and through the cut-away portion 15a to the air surrounding the aircraft. When the pressure on top of the fuel in the fuel tank is sufficiently reduced, the spring 14 moves the valve head 13 so as to press it on to the seating 12a again.

In order that the dynamic pressure of air surrounding the aircraft prevailing in the compartment 10a shall not move the valve from the closed position, the effective area of the valve head 13 should be equal to the effective area of the diaphragm 21, i. e. the diameter A—A should substantially equal the diameter B—B.

Also the effective area of the diaphragm 17 should be less and is preferably very much less than that of the diaphragm 21, i. e. in Fig. 1 the diameter C—C should be less than the diameter A—A or the diameter B—B.

The bore 16a should be of a suitable cross section to allow air to pass freely between the compartments 10a and 23a without undue restriction.

The compartments 10a and 23a may be kept in communication with one another, in place of by means of the bore 16a, by means of a bore in the wall or of an air conducting pipe outside the casing 10. Alternatively the compartment 23a may be connected by a pipe to the skin of the aeroplane, so as to be in direct communication with the air flowing past the aircraft.

A three-way cock 24 is attached to the socket 23b which has three positions: a first position in which it connects the space 10c through pipe 25a to a point of the aircraft known to be under static air pressure; a second position in which it connects said space 10c to an external pressure source through a pipe 25b and reduction valve 26 applying a pressure moderately exceeding static air pressure to space 10c so as to provide a pneumatic resilient biasing force in the direction of closing the valve head 13, in which case spring 14 may be dispensed with; and a third position in which it connects the said space 10c through a pipe 25c to an external pressure source of high pressure locking the said valve head in the closed position, e. g. in inverted flight so as to prevent loss of fuel through the vent valve.

Referring now to Fig. 2 the valve head 13' opens inwardly, and the diaphragm 17' is of a larger effective area than the said valve head 13' and the diaphragm 21' of an effective area equal to that of the valve head 13'. The aerodynamic pressure acting at equal force in opposite directions on the valve head 13' and the diaphragm 21' cancels itself out. The valve head 13' will open inwardly towards the interior of the tank when the difference between internal pressure and static air pressure acting on the difference between the larger effective area of diaphragm 17' and the smaller effective area of diaphragm 21' and of the valve head 13' exceeds the closing force of a resilient biasing means 14'.

Referring now to Figs. 3 and 4:

In Fig. 3 compartments 10a" and 10d" are exposed to the internal pressure, compartment 10b" to aerodynamic pressure and compartment 10c" to static pressure; the valve head 13" opens outwardly into the compartment 10b" and the diaphragm 21" is of a smaller effective area than the said valve head 13" and the diaphragm 17" which is of equal effective area to that of the valve head 13". The aerodynamic pressure acting at equal force in opposite directions on the valve head 13" and the diaphragm 17" cancels itself out. The valve head 13" will open outwardly towards the compartment 10c" in communication with aerodynamic pressure when the difference between internal pressure and static air pressure acting on the difference between the larger effective areas of diaphragm 17" and valve head 13" and the smaller effective area of diaphragm 21" exceeds the closing force of a resilient biasing means 14".

In Fig. 4 compartments 10a''' and 10d''' are exposed to the internal pressure, compartment 10b''' to aerodynamic pressure and compartment 10c''' to static pressure. The valve head 13''' opens inwardly into the compartment 10a''' and the diaphragm 21''' is of a larger effective area than the said valve head 13''' and the diaphragm 17''' which is of equal effective area to that of the valve head 13'''. The aerodynamic pressure acting at equal force in opposite directions on the valve head 13''' and the diaphragm 17''' cancels itself out. The valve head 13''' will open inwardly towards the interior of the tank when the difference between internal pressure and static air pressure acting on the difference between the larger effective area of diaphragm 21''' and the smaller effective areas of diaphragm 17''' and valve head 13''' exceeds the closing force of the resilient biasing means 14'''.

Fig. 1a shows a modified detail of the embodiment of the vent valve shown in Fig. 1: the simple compression spring 14 of this embodiment is here replaced by a compound compensating spring arrangement consisting of two compression springs 14' and 14", each fitted round a telescopic bolt 27 linked at one end at 28 to the valve head 13', and at the other end at 29 to the casing 10 within the recess 10a, the said telescopic bolts 27 being arranged diagonally outward from the valve head 13' to the casing 10.

The arrangement of all the embodiments of the valve may be reversed when it is desired to keep the pressure within the container a predetermined amount below the immediately surrounding pressure (instead of above said pressure as described hereinabove), for example below the aerodynamic pressure outside a wing tank of an aircraft. In this case the diameter C—C in Figs. 1 and 3 has to be made larger than the diameter A—A, and conversely, the diameter C—C in Figs. 2 and 4 has to be made smaller than the diameter A—A.

While I have described and illustrated what may be considered a typical and particularaly useful embodiment of my said invention I wish it to be understood that I do not limit myself to the particular details and dimensions described and illustrated, for obvious modifications will occur to a person skilled in the art.

What I claim as my invention and desire to secure by Letters Patent is:

1. An aircraft fuel tank, comprising in combination: a tank, a valve casing fitted into the said tank, and having a valve seat, a valve head seated on the said seat and controlling thereby a vent passage from the interior of the said tank through the said seat to the ambient atmosphere, the space on one side of the said valve head being in operation in fluid communication with air under aerodynamic pressure and the space on the other side of the said valve head being in fluid communication with the interior of the said tank; first pressure responsive means located in the said casing and of an effective area equivalent to that of the said valve head mechanically connected therewith, the space in the said casing on one side of the said first pressure responsive means being in operation in fluid communication with air under aerodynamic pressure in the opposite direction and cancelling out the action of the latter on the said valve head, and the space in the said casing on the other side of the said first pressure responsive means being in fluid communication with air under static air pressure acting on the said first pressure responsive means in the opposite direction of the action of the aerodynamic pressure on the same, second pressure responsive means located in the said casing and of an effective area different from that of the said valve head, the space in the said casing on one side of the said second pressure responsive means being in fluid communication with the interior of the said tank and the space in the said casing on the other side of the said second pressure responsive means being in fluid communication with air under static pressure acting in the opposite direction of the action of the static pressure on the said second pressure responsive means, the latter being thus controlled by the difference between the pressure in the interior of the said tank and the static air pressure, and resilient means operatively connected to said valve head and casing and biasing the said valve head on to the said seat.

2. A fuel tank as claimed in claim 1 comprising in addition: electrical heating means arranged in the said casing adjacent the said valve head.

3. An aircraft fuel tank having a vent valve, opening outwardly from the interior of the said tank to the ambient atmosphere, comprising in combination: a tank, a valve casing fitted into the said tank and having a valve seat, a valve head seated on and resiliently biased against the said seat from outside, and controlling a vent passage from the interior of the said tank through the said seat to the ambient atmosphere, the space of the said casing outside with respect to said valve head being in operation in fluid communication with air under aerodynamic pressure, and the space in the said casing inside with respect to said valve head being in fluid communication with the interior of the said tank; a first diaphragm of an effective area different from, and a second diaphragm of an effective area equal to the said valve head, both the said diaphragms being mechanically connected at their centers to the said valve head and at their perimeters to the said casing, the space in the said casing at one side of the said first diaphragm being in operation in fluid communication with the interior of the said tank and exposed to the pressure prevailing therein in the sense of closing the said valve and the space in the said casing at the other side of the said first diaphragm being in operation in fluid communication with air under static air pressure acting in the sense of opening the said valve, and the space in the said casing on one side of the said second diaphragm being in operation in fluid communication with air under static air pressure in the sense of closing the said valve, and the space in the said casing on the other side of the said second diaphragm being in operation in fluid communication with air under aerodynamic pressure in the opposite sense to the action of the latter on the said valve head.

4. An aircraft fuel tank having a vent valve opening inwardly from the interior of the said tank to the ambient atmosphere, comprising in combination: a tank, a valve casing fitted into the said tank and having a valve seat, a valve head seated on and resiliently biased against the said seat from inside, and controlling a vent passage from the interior of the said tank through the said seat to the ambient atmosphere, the space of the said casing outside with respect to the said valve head being in operation in fluid communication with air under aerodynamic pressure and the space in the said casing inside with respect to the said valve head being in fluid communication with the interior of the said tank; a first diaphragm of an effective area other than and a second diaphragm of an effective area equal to that of the said valve head, both the said diaphragms being mechanically connected at their centers to the said valve head and at their perimeters to the said casing, the space in the said casing at one side of the said first diaphragm being in operation in fluid communication with the interior of said tank and exposed to the pressure prevailing therein in the sense of opening the said valve and the space in the said casing at the other side of the said first diaphragm being in fluid communication with air under static pressure acting in the sense of closing the said valve, the space in said casing at one side of the said second diaphragm being in fluid communication with air under static pressure acting in the sense of opening the said valve and the space in the said casing at the other side of the said second diaphragm being in operation in fluid communication with air under aerodynamic pressure acting on the said second diaphragm in the opposite direction of its action on the said valve head.

5. An aircraft fuel tank, comprising in combination: a tank, a valve casing fitted into the said tank flush with the outer surface thereof and having a valve seat arranged in a recess which in operation is in open fluid communication with air under aerodynamic pressure, a valve head seated on the said valve seat and controlling thereby a vent passage from the interior of the said tank through the said seat to the ambient atmosphere, a compression spring operatively connected to the said casing and valve head and biasing the latter on its seat, a valve stem fixedly connected to the said valve head, a first diaphragm of an effective area other than that of the said valve head fixedly attached at its center to the said stem and at its perimeter to the said casing, and defining between itself and the said valve head a space in the said casing which space is in fluid communication with the interior of the said tank, a second diaphragm of an effective area equal to that of the said valve head fixedly attached at its center to the said stem and at its perimeter to the said casing and defining between itself and the said first diaphragm a space in the said casing which space is in fluid communication with air under static pressure, and an inner lid attached to the said casing defining between itself and the said second diaphragm a space in the said casing which space is in operation in fluid communication with the said aerodynamic pressure.

6. A fuel tank as claimed in claim 5, wherein the said stem is hollow and through an aperture in the said valve head forms the said fluid communication of the said space in the casing between the said second diaphragm and the said inner lid to the air under aerodynamic pressure in the said open recess of the said casing.

7. An aircraft fuel tank, comprising in combination: a tank, a valve casing fitted into the said tank flush with the outer surface thereof, and having a valve seat arranged in a recess which in operation is in open fluid communication with air under aerodynamic pressure, a valve head seated on the said valve seat and controlling thereby a vent passage from the interior of the said tank through the said seat to the ambient atmosphere, a valve stem fixedly connected to said valve head, a first diaphragm of an effective area other than that of the said valve body fixedly attached at its center to the said valve head and at its perimeter to the said casing, and defining between itself and the said valve head a space in the said casing which space is in fluid communication with the interior of the said tank, a second diaphragm of an effective area equal to that of the said valve head fixedly attached at its center to the said stem and at its perimeter to the said casing, and defining between itself and the said first diaphragm a space in the said casing which space is in fluid communication with an external source of pneumatic pressure exceeding the static air pressure and providing a resilient bias in the closing direction of the said valve head, and an inner lid attached to the said casing and defining between itself and the said second diaphragm a space in the said casing which space is in operation in fluid communication with air under aerodynamic pressure.

8. An aricraft fuel tank, comprising in combination: a tank, a valve casing fitted into the said tank and having a valve seat, a valve head seated on and being resiliently biased against said valve seat and thereby controlling a vent passage from the interior of the said tank to the ambient atmosphere, the space outside with respect to the said valve head being in fluid communication in operation with air under aerodynamic pressure, a first diaphragm of an effective area smaller than that of the said valve head and defining between itself and the said valve head a space in the said casing in fluid communication with the interior of the said tank and a second diaphragm of an effective area equal to that of the said valve head, both the said diaphragms being mechanically connected at their centers to the said valve head and at their perimeters to the said casing, and defining between one another a space inside the said casing, switch-over valve means in fluid communication with the said space defined between the said two diaphragms and having one position connecting the last mentioned space to air under static air pressure and another position connecting the same to an external source of pneumatic pressure, and an inner lid attached to the said casing defining between itself and the said second diaphragm a space in the said casing which space is in operation in fluid communication with air under aerodynamic pressure, the said external pneumatic pressure exceeding both the said static pressure and the pressure in the tank and locking the said valve head against the said seat.

References Cited in the file of this patent

UNITED STATES PATENTS

| | | |
|---|---|---|
| 2,345,547 | Roth et al. | Mar. 28, 1944 |
| 2,459,000 | Morris | Jan. 11, 1949 |
| 2,641,985 | Jensen | June 16, 1953 |